United States Patent [19]

Pien et al.

[11] Patent Number: 5,463,830
[45] Date of Patent: Nov. 7, 1995

[54] VEGETATION-INHIBITING PRODUCT FOR YOUNG PLANTINGS

[75] Inventors: André L. J. Pien, Sint Genesius-Rode; Carlo E. M. De Pauw, Overijse, both of Belgium

[73] Assignee: Wetenschappelijk en Technisch Centrum voor het Bouwbedrijf, Belgium

[21] Appl. No.: 990,569

[22] Filed: Dec. 15, 1992

[30] Foreign Application Priority Data

Dec. 16, 1991 [BE] Belgium ................. 91.01141

[51] Int. Cl.⁶ ..................................... A01G 7/00
[52] U.S. Cl. ........................................ 47/9; 47/5.5
[58] Field of Search ........................ 47/9, 5.5, 48.5

[56] References Cited

U.S. PATENT DOCUMENTS 3,847,195 12/1974 Johnson ........................... 47/9
3,870,583 3/1975 Gidge .......................... 156/500

FOREIGN PATENT DOCUMENTS 1001576 12/1989 Belgium .
2590763 6/1987 France .
2170795 8/1986 United Kingdom .

OTHER PUBLICATIONS

Computer printout of World Patent Index Latest, Section Ch., Week 9202, 14 Nov. 1991, Derwent Publications Ltd., London, GB Class C, AN 92–007894 & AU–D–7 637 291.
Computer Printout Pryce. "Alternatives to Peat" 1991.

Primary Examiner—Raymond Henley, III
Assistant Examiner—K. Weddington
Attorney, Agent, or Firm—Webb Ziesenheim Bruening Logsdon Orkin & Hanson

[57] ABSTRACT

The invention relates to a vegetation-inhibiting product for young plantings. The product includes paper sludge in a quantity of 30–99% by weight; composted organic waste in a quantity of 0.5–70% by weight; fiber material in a quantity of 0.1–20% by weight; and wood particles in a quantity of 0–70% by weight.

19 Claims, No Drawings

VEGETATION-INHIBITING PRODUCT FOR YOUNG PLANTINGS

The present invention relates to a vegetation-inhibiting product for young plantings.

The present invention relates more particularly to so-called tree sheets with which young plantings can be protected against competing vegetation in that the vegetation-inhibiting product is arranged around the young plantings. This vegetation-inhibiting product according to the invention can take the form of a form-retaining, sheet-like product or the form of a curable slurry.

The Belgian patent specification 1.001.576 relates among other things to a shaped product as growth medium on the basis of a mixture of paper sludge containing compost and fermented cellulose fibres.

This product has been found for the moment to be inadequate for use in practice, mainly due to a biological degradation to harmless elements and/or nutrients that is difficult to control and lack of reproducibility in the composition of the raw materials.

The present invention has for its object to provide a vegetation-inhibiting, weed-inhibiting and plant stimulating product substantially not possessing the above stated drawbacks. By weed-inhibiting is meant that on the one hand the competing vegetation around the young planting is inhibited and that on the other germination on the sheet is minimal. The composition of the vegetation-inhibiting product according to the invention must moreover be suitable to prevent competing vegetation in the case of young plantings for a period of several years, for instance three years, while the product degrades biologically to harmless raw materials which preferably have a soil-improving effect. The product according to the invention must further be resistant to weather influences, particularly frost, rain and UV radiation, to the extent that durability is ensured during the protection period of for instance at least three years. Finally, the vegetation-inhibiting product according to the invention must improve the water management at the location of the young planting and, in the case of a form-retaining product, have sufficient rigidity to enable manual application. In the case of a slurry-like consistency the vegetation-inhibiting product must cure in relatively short time to a form-retaining product.

This is achieved with a vegetation-inhibiting product according to the invention containing:

i) paper sludge in a quantity of 30–99% by weight;

ii) composted organic waste in a quantity of 0.5–70% by weight;

iii) fibre material in a quantity of 0.1–20% by weight; and iv) wood particles in a quantity of 0–70% by weight.

The paper sludge coming from a waste water purification installation in paper manufacture does not have to be fermented beforehand. It is important that the paper sludge has a sufficient curing effect resulting from the kaolin and cellulose fibres that are present. Use of paper sludge below 30% by weight results in insufficient curing, while use in a quantity of for instance 99% by weight will result in the vegetation-inhibiting product having insufficient nutrients.

A paper sludge originating from paper manufacture and having adequate curing function contains substantially:

a) organic material 10–65% dry material;

b) nitrogen 0.05–1% dry material;

c) phosphor ($P_2O_5$) 0.05–0.5% dry material;

d) calcium (CaO) max. 25% dry material; and e) aluminium ($Al_2O_3$) max. 10% dry material.

The composted organic waste is preferably household waste, namely vegetable, fruit and garden refuse, so-called VFG refuse. The organic waste may also comprise integral domestic refuse or other organic (residual) materials. Composting may be performed aerobically or anaerobically.

According to the invention the organic waste and the sludge can be mixed with each other prior to and after composting and fermenting. It is hereby possible on the one hand to subject the basic products as a mixture to a joint fermentation and on the other to mix the composted waste with only partly fermented paper sludge. This results in a product substantially free per se of biological activity, particularly microbiological activity, which could result in odour formation and mould forming.

The composted organic waste is added in a quantity of at least 0.5% by weight, since below this lower limit the quantity of nutrients present becomes too small. If the quantity of composted organic waste is greater than 70% by weight no sufficiently form-retaining end product can be formed.

The fibre material added to the vegetation-inhibiting product is mainly intended to obtain an adequate curing and rigidity. Organic and inorganic fibres can be added. Considered suitable as organic fibres are cotton fibres, wool fibres, paper fibres, wood fibres, sawdust and sisal. As inorganic fibres can be used inter alia glass fibres, ceramic fibres and rockwool fibres. Considered suitable for use as organic fibres are both natural (paper, cotton, wood, wool, sawdust) and synthetic (polyethylene, polypropylene, polyamide, polyacryl) fibres. A very advantageous product that can be applied is textile fibre, a waste product from the textile industry. The fibre material must contain fibres in the range of 0.5 mm to 5 cm. Outside this range an insufficient effect occurs or the fibre material cannot be adequately mixed with the other constituents of the vegetation-inhibiting product. The fibres must generally have a length of more than 1 cm. If less than 0.1% by weight of fibre material is present the product has insufficient mechanical strength and reduced frost resistance. If the fibre material is added in a quantity of more than 20% by weight the fibre material cannot be mixed sufficiently homogeneously with the other constituents.

If the vegetation-inhibiting product according to the invention contains wood particles, namely wood particles coming from a wood type with a relatively high tannin content such as a tannin content of roughly 1%, the biological degradation can be slowed. The wood particles can take the form of sawdust, wood shavings and wood dust. Suitable wood particles come particularly from oak-wood. If more than 70% by weight of wood particles is added no practically relevant product is obtained.

An optimal vegetation-inhibiting product for young plantings according to the invention is obtained when this contains:

i) paper sludge in a quantity of 35–60% by weight;

ii) composted organic waste in a quantity of 20–60% by weight;

iii) fibre material in a quantity of 5–15% by weight; and iv) wood particles in a quantity of 5–30% by weight.

The vegetation-inhibiting product can be applied in the form of finished, form-retaining sheet-like products, as well as in the form of a curing slurry. In the first case a mixture of the constituents is preferably pressed and dried.

This mixture comprises a dry material content of about 20–50% by weight, preferably 25–45% by weight, more preferably 30–40% by weight. The impact strength and the flexural strength may be increased further when the product has a laminated structure of in general 5–50 sublayers, preferably 10–40 sublayers, and more preferably 20–35 sublayers, such as 30 sublayers.

The laminated structure is obtained by using a mixture comprising in general only 1–15% by weight dry material, preferably 2–10% by weight, more preferably 2–5% by weight dry material. This mixture is prepared in a pulper, applied on a sieve band and the layer formed is subsequently taken up by a roller. The layer is wound on the roller until the desired number of product sublayers is obtained. The wound cylindrical structure on the roller is axially cut and released from the roller. The structure possesses already a sufficient strength such that it can be dried in a suspended position. Finally, the structure is pressed and cut into products of the invention having a laminated structure.

The laminated product (30 sublayers) has a tensile strength of 5.8±0.2 N/mm$^2$ and a flexural strength of 0.45±0.05 N/mm$^2$, both in the fiber direction.

Vegetation inhibition is optimal, although eventually moss-grown providing an aestetically improved appearance.

In the case of the slurry, a slurry, for instance a mash, of the constituents is arranged round the young planting at the intended location, whereafter this mash cures to a form-retaining product. Additional thickeners can optionally be added to this slurry such as carboxymethylcellulose or hydroxyethylcellulose.

The fertilizer value of the vegetation-inhibiting product according to the invention is good. The available quantities of nutrients are for instance phosphor 120 mg/kg, potassium 3,000 mg/kg and magnesium 800 mg/kg. The total nitrogen quantity amounts to 21,000 mg/kg.

A vegetation-inhibiting product according to the invention contained according to a first embodiment 45% by weight paper sludge, 45% by weight compost and 10% by weight textile fibres. This product had a pH of about 6.8 and an organic material content of about 50%.

Another vegetation-inhibiting product disposable in the form of a slurry contained 40% by weight paper sludge, 40% by weight compost, 10% by weight textile fibres and 10% by weight oak shavings.

The dry strength of the products varied between 0.3 and 0.4 N/mm$^2$.

Test samples of both products were subjected to a test for frost behaviour. The test samples were saturated with water and subjected to different frost cycles (16 hours of frost at −15° C., 8 hours thaw). After twenty such frost cycles no material damage was detected. In practical conditions hardly any frost damage was detected after two winter seasons. Both types of vegetation-inhibiting products were further capable of inhibiting undesired vegetation to less than 5%.

Although the vegetation-inhibiting products according to the invention are mainly composed of recycled waste products, if necessary after treatment, the concentrations of heavy metals are far below the current maximum permissible EC norms for the use of sludge in agriculture.

We claim:

1. A form-retaining, sheet-like product which inhibits competing vegetation for young plantings comprising:
   i) paper sludge in a quantity of 30–99% by weight;
   ii) composted organic waste in a quantity of 0.5–70% by weight;
   iii) fibre material in a quantity of 0.1–20% by weight, with said fibre material containing fibres having a fibre length of 0.5 mm to 50 mm; and
   iv) wood particles present in a quantity up to 70% by weight and constituting a remainder of said product, with said wood particles having a high tannin content.

2. The product of claim 1 wherein said wood particles are included in a quantity of 5–70% by weight.

3. The product of claim 1 wherein the tannin content of said wood particles is about 1 percent.

4. The product of claim 1 wherein said wood particles are oak.

5. The product of claim 1 wherein said wood particles are selected from the group consisting of sawdust, wood shavings, and wood dust.

6. The product of claim 1 wherein said composted organic waste is selected from the group consisting of vegetable refuse, fruit refuse, and garden refuse.

7. The product of claim 1 wherein said product is formed as a laminated structure.

8. The product of claim 7 wherein said laminated structure includes 5–50 sublayers.

9. The product of claim 7 wherein said laminated structure includes 10–40 sublayers.

10. The product of claim 7 wherein said laminated structure includes 20–35 sublayers.

11. The product of claim 7 wherein said laminated structure has a tensile strength of 5.8±0.2 N/mm$^2$ in a fibre direction and a flexural strength of 0.45±0.05 N/mm$^2$ also in said fibre direction.

12. A form-retaining, sheet-like product which inhibits competing vegetation for young plantings comprising:
   i) paper sludge in a quantity of 35–60% by weight;
   ii) composted organic waste in a quantity of 20–60% by weight;
   iii) fibre material in a quantity of 5–15% by weight, with said fibre material containing fibres having a fibre length of 0.5 mm to 50 mm; and
   iv) wood particles in a quantity of 5–30% by weight, with said wood particles having a high tannin content.

13. The product of claim 12 wherein the tannin content of said wood particles is about 1 percent.

14. The product of claim 12 wherein said organic waste is selected from the group consisting of vegetable refuse, fruit refuse, and garden refuse.

15. The product of claim 12 wherein said product is formed as a laminated structure.

16. The product of claim 15 wherein said laminated structure includes 5–50 sublayers.

17. A form-retaining, sheet-like product which inhibits competing vegetation for young plantings comprising:
   i) paper sludge in a quantity of 35–60% by weight;
   ii) composted organic waste in a quantity of 20–60% by weight selected from the group consisting of vegetable refuse, fruit refuse, and garden refuse;
   iii) fibre material in a quantity of 5–15% by weight, with said fibre material containing fibres having a fibre length of 0.5 mm to 50 mm; and
   iv) oak wood particles in a quantity of 5–30% by weight, with said oak wood particles having a tannin content of about 1 percent.

18. The product of claim 17 wherein said product is formed as a laminated structure having 5–50 sublayers.

19. A curable slurry which inhibits competing vegetation for young plantings comprising:
   i) paper sludge in a quantity of 30–99% by weight;
   ii) composted organic waste in a quantity of 0.5–70% by weight;
   iii) fibre material in a quantity of 0.1–20% by weight, with said fibre material containing fibres having a fibre length of 0.5 mm to 50 mm; and
   iv) wood particles present in a quantity up to 70% by weight and constituting a remainder of said product, with said wood particles having a high tannin content.

* * * * *